UNITED STATES PATENT OFFICE.

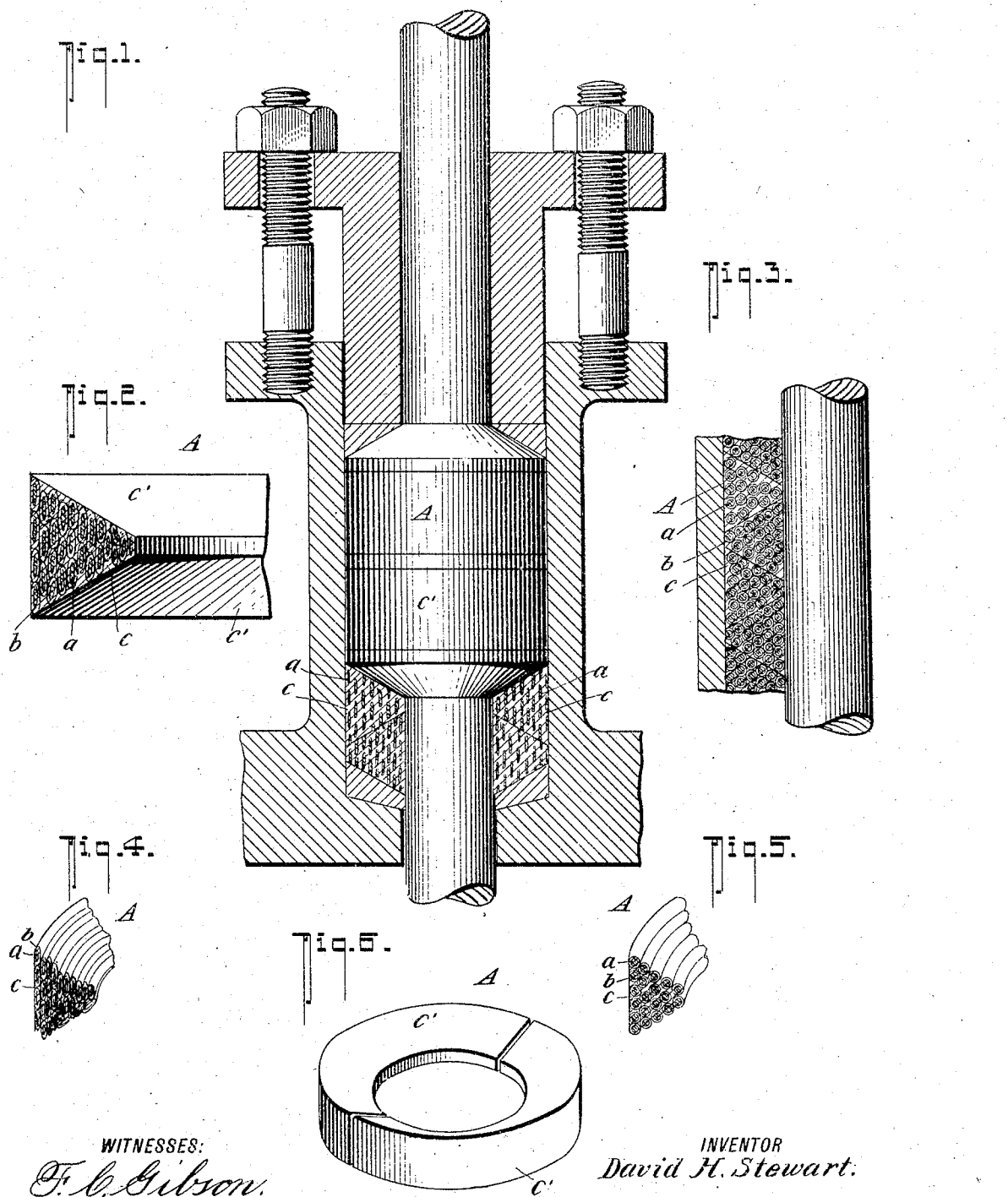

DAVID H. STEWART, OF AVALON, PENNSYLVANIA.

ROD-PACKING.

SPECIFICATION forming part of Letters Patent No. 778,430, dated December 27, 1904.

Application filed April 11, 1904. Serial No. 202,695.

*To all whom it may concern:*

Be it known that I, DAVID H. STEWART, residing at Avalon, in the county of Allegheny and State of Pennsylvania, have invented a new and Improved Rod-Packing, of which the following is a specification.

My invention relates to improvements in that class of packing for steam-engines, pumps, air-compressors, and similar devices which comprises a composition formed of antifriction metal particles and a lubricant pressed into a more or less hard mass; and it more particularly refers to improvements in that form of packing generally disclosed in my copending application, Serial No. 186,359, filed December 23, 1903.

Heretofore packing of the character noted has been provided in which the body of the packing has been composed of segregated antifriction particles—such as pellets, turnings, or chips, and a lubricant compressed with the chips into a substantially solid mass. In the use of packing such as referred to such type of packing has been found as giving generally satisfactory results; yet all the results desired have not been acquired from the use of such form of packing, for the reason that the particles that constitute the packing-body are frequently dissipated or absorbed by the heat and often caused to cohere irregularly, and thereby destroys the proper elasticity of the packing in all directions and perfect application of the packing about the shaft.

In my present invention I have shown a packing whose constituent parts are so combined as to insure at all times a proper application of the packing-body in all directions and a perfect fitting about the rod and in a manner so as to withstand a maximum wear under a minimum amount of friction.

My present invention also comprehends an improved type of packing of the character stated in which the antifriction metal particles are in the nature of one or more continuous ribbons or thin strands of antifriction metal, in themselves lubricant-coated and compressed to the desired shape in cross-section with a substance that coheres with the coated metal particles.

Another object of my present invention is to provide a packing of the character stated formed of a lubricant-coated metal ribbon or thin wire wound continuously upon itself to the desired cross-sectional shape and compressed to the shape to which the ribbon or wire is initially wound.

My present invention also embodies certain details of construction and arrangement of parts, all of which will be first fully explained, then pointed out in the appended claims, and illustrated in the accompanying drawings, in which—

Figure 1 is a cross-section of a stuffing-box with my improved packing applied for use, the packing-rings being partly in elevation and partly in section. Fig. 2 is a cross-section of one of the segments on an enlarged scale. Fig. 3 is a similar view showing a slightly-modified form of my invention. Fig. 4 is a detail perspective view of a portion of a packing-ring formed in accordance with the modified construction shown in Fig. 1. Fig. 5 is a detail perspective view of a portion of a packing-ring formed in accordance with the construction shown in Fig. 2. Fig. 6 is a detail perspective view of my improved packing-ring.

In my present invention the packing-ring comprises a wedge-shape body, preferably V-shaped, as shown in Fig. 1, whereby the several packing-rings required for a box to make a complete packing can be conveniently and quickly adjusted for use.

The packing-rings A in the preferred form of my present invention each consists of a mass of antifriction metal particles, a lubricant, (graphite,) and a cohesive material, all compressed into a hard dense body. The cohesive material may be beeswax, gum-shellac, or any other analogous composition capable of withstanding a high degree of heat before melting.

In the forms shown in Figs. 1, 2, and 4 the metallic particles in my present form of packing consist of a thin antifriction metal ribbon *a*, which is coated with a suitable lubricant *b* (graphite) and which is wound upon itself in superimposed layers, with its edges continuously overlapping in such manner to form, substantially, a wedge shape in cross-section. In the manufacture of my form of packing the ribbon as it is wound upon itself is saturated with a mixture of cohesive material C—such as beeswax, gum-shellac, &c.— and a lubricant, (graphite,) the whole being generally formed in a suitable mold. After the packing is generally formed the several constituent parts—that is, the lubricant-coated metallic ribbon, the graphite, and the cohesive material—is compressed into a hard mass.

Instead of winding the metallic ribbon or intermixing with it as it is wound into shape a cohesive material and graphite the ribbon may be preferably covered with a thick coating of cohesive material and graphite and the said ribbon thus treated wound tightly into superimposed layers in the general shape in cross-section desired and then compressed into a homogeneous mass.

Instead of forming the antifriction metal particles of my packing of a continuous thin sheet or ribbon the same general results are obtained by forming the metal particles of the packing of a wire coated with a cohesive substance and lubricant mixed and then wound upon itself to the cross-sectional shape desired and then compressed into a homogeneous mass.

By constructing the packing-body in the manner shown and described it will be apparent that the metallic particles of my packing are distributed regularly and evenly throughout the entire body of the packing-ring, and hence the danger of portions thereof being drawn up in an irregular mass, as is incident in the use of packing in which the metal particles consist of chips or turnings, is overcome. Furthermore, by reason of the volute winding of the ribbon or wire a regular radial expansibility of the packing-body is maintained at all times, and hence a maximum amount of wear of the packing is secured with a minimum friction and with the minimum danger of destroying the regularity of the elastic qualities of the packing. Furthermore, by reason of the peculiar formation of my present form of packing I find from practical use that the danger of the contacting packing-rings adhering to each other or solidifying is reduced to the minimum, and the necessity of the use of insulating members which consist of rings or washers formed of Babbitt metal or papier-mâché that are usually mounted upon the rods between each pair of packing-rings is dispensed with.

In practice the coated wire or ribbon is of a thickness of heavy paper, and the said wire or ribbon is wound in a mold and then compressed. While I have shown the ribbon as composed of a thin flat sheet, yet I desire it understood that it need not be flat, but might be square or other shape in cross-section, the essential feature of my present invention consisting in forming the metallic portions of the packing of a continuous flexible or elastic thin body of any antifriction metal coated primarily with a lubricant or in its more detailed construction with a coating of cohesive substance and lubricant.

After the packing-ring is formed it is understood that the same may be cut up into segments in the usual manner, and the several segments may be finished by being further treated with a supplemental coating C' of antifriction pliable body.

In practice I form my improved packing-rings by compressing them under a pressure of about thirty tons and at a higher temperature than that to which they will be subjected when in use on engine or pump shafts.

By reason of the peculiar manner in which the ribbon or wire members are wound about each other in superimposed layers the said members when in position for use within the gland about the rod or shaft will expand under any applied heat of less than 300°, and the said packing-rings thereby automatically tighten themselves within the gland, and the several parts constituting the rings will not adhere or become massed, as does occur when the packing is composed of pellets, chips, or other similar particles.

Another advantage of my form of packing is that in practice the same has been found capable of withstanding pressure of about five thousand pounds.

Having thus described my invention, what I claim, and desire to secure by Letters Patent, is—

1. A packing for stuffing-boxes and the like, composed of a ring-shaped body formed of a continuous piece of metal wound about itself and coated with an antifriction material.

2. A packing for stuffing-boxes and the like, composed of a metal ribbon wound about itself and coated with antifriction material and compressed into a ring shape.

3. A packing for stuffing-boxes and the like, composed of a thin, flexible metal body coated with a pliable antifriction material wound upon itself in concentric layers and compressed into a ring shape.

4. A packing-ring which consists of a flexible metal strand coated with a pliable antifriction material wound upon itself in concentric layers and compressed in a predetermined cross-sectional shape.

5. A packing for stuffing-boxes and the like composed of a series of thin flexible metal strips wound upon themselves in concentric superimposed layers, said layers being coated with a mixture of graphite, and a plastic material that binds metal and graphite together, for the purposes specified.

6. A packing, composed of a lubricant and one or more sheets of antifriction metal wound about each other and in concentric layers pressed into a solid mass with the lubricant.

7. A packing which consists of thin sheets of antifriction metal wound concentrically about each other and a lubricant pressed with the metal sheets to form a solid mass and a supplemental coating surrounding the said solid mass.

8. A packing which consists of a series of thin strands of lubricant-coated antifriction metal, wound in superimposed layers in a predetermined shape in cross-section and compressed to such shape whereby to form a solid mass as set forth.

9. A packing formed of a body consisting of thin metal strands wound continuously about themselves to form a solid mass and a lubricant compressed together with the said wound mass of strands into a solid body and a supplemental pliable coating of an antifriction material surrounding the said compressed mass, as set forth.

DAVID H. STEWART.

Witnesses:
E. H. DERMITT,
ELIZABETH KIRKWOOD.